United States Patent
Nakagawa

(10) Patent No.: US 12,240,279 B2
(45) Date of Patent: Mar. 4, 2025

(54) MOTORCYCLE TIRE

(71) Applicant: Sumitomo Rubber Industries, Ltd., Kobe (JP)

(72) Inventor: Mamoru Nakagawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/104,943

(22) Filed: Feb. 2, 2023

(65) Prior Publication Data
US 2023/0302852 A1 Sep. 28, 2023

(30) Foreign Application Priority Data

Mar. 28, 2022 (JP) ................................ 2022-052295

(51) Int. Cl.
*B60C 9/18* (2006.01)
*B60C 9/20* (2006.01)
*B60C 9/22* (2006.01)

(52) U.S. Cl.
CPC .... *B60C 9/2204* (2013.01); *B60C 2009/2022* (2013.01); *B60C 2009/2252* (2013.01); *B60C 2200/10* (2013.01)

(58) Field of Classification Search
CPC ......... B60C 9/1835; B60C 9/22; B60C 9/185; B60C 2009/1842; B60C 2009/2022; B60C 2200/10; B60C 9/2204
See application file for complete search history.

(56) References Cited

U.S. PATENT DOCUMENTS

| 2008/0035263 | A1* | 2/2008 | Nakamura | B60C 9/2204 |
| | | | | 152/538 |
| 2009/0095396 | A1* | 4/2009 | Harikae | B60C 9/2006 |
| | | | | 152/527 |
| 2014/0283969 | A1* | 9/2014 | Domingo | B60C 1/00 |
| | | | | 152/535 |
| 2016/0361951 | A1* | 12/2016 | Clayton | G06F 30/00 |

FOREIGN PATENT DOCUMENTS

| EP | 484075 | * | 5/1992 |
| EP | 732226 | * | 9/1996 |

(Continued)

OTHER PUBLICATIONS

Machine translation of JP 2010-36598, 2010.*

*Primary Examiner* — Justin R Fischer
(74) *Attorney, Agent, or Firm* — Birch, Stewart, Kolasch & Birch, LLP

(57) ABSTRACT

A motorcycle tire includes a tread portion, sidewall portions, bead portions each with a bead core therein, a carcass, and a tread reinforcing layer arranged radially outwardly of the carcass and includes a belt layer and a band layer. The belt layer includes an inner belt ply and an outer belt ply. The band layer includes a band ply arranged between the inner and outer belt plies. The inner belt ply includes belt cords oriented at an angle greater than 5 degrees to the tire circumferential direction and a first development width. The outer belt ply includes belt cords oriented at an angle greater than 5 degrees to the tire circumferential direction and a second development width. The band ply includes band cords oriented at an angle not more than 5 degrees to the tire circumferential direction. The second development width is greater than the first development width.

7 Claims, 3 Drawing Sheets

(56) References Cited

FOREIGN PATENT DOCUMENTS

| | | | | |
|---|---|---|---|---|
| EP | 990539 | * | 4/2000 | |
| EP | 1787825 A1 | * | 5/2007 | ............ B60C 9/185 |
| EP | 2363305 | * | 9/2018 | |
| JP | 01311901 | * | 12/1989 | |
| JP | 2010-36598 | * | 2/2010 | |
| JP | 2018-111375 A | | 7/2018 | |

* cited by examiner

MOTORCYCLE TIRE

RELATED APPLICATIONS

This application claims the benefit of foreign priority to Japanese Patent Application No. JP2022-052295, filed Mar. 28, 2022, which is incorporated by reference in its entirety.

FIELD OF THE DISCLOSURE

The present disclosure relates to a motorcycle tire capable of improving turning performance and durability.

BACKGROUND OF THE DISCLOSURE

Conventionally, a motorcycle tire with improved turning performance which includes a tread portion with a tread reinforcing layer has been known. For example, Patent document 1 below has proposed a motorcycle tire that includes a tread reinforcing layer consisting of two belt plies arranged outwardly in the tire radial direction of the carcass and a single band ply arranged outwardly in the tire radial direction of the belt plies.

PATENT DOCUMENT

[Patent document 1] Japanese Patent Application Publication 2018-111375

SUMMARY OF THE DISCLOSURE

Unfortunately, the motorcycle tire of Patent Document 1 generates a large cornering force due to the hoop effect of the two belt plies, and when the centrifugal force is small, such as in a gentle turn condition, the force to make the camber angle of the motorcycle small tends to be large. Thus, further improvement is desired in the turning performance of the motorcycle tire of Patent Document 1 when the centrifugal force is small, as well as in the durability.

The present disclosure has been made in view of the above circumstances and has a major object to provide a motorcycle tire capable of improving turning performance and durability.

In one aspect of the present disclosure, a motorcycle tire includes a tread portion, a pair of sidewall portions, a pair of bead portions each with a bead core therein, a carcass extending between the bead cores through the tread portion and the pair of sidewall portions, and a tread reinforcing layer arranged outwardly in a tire radial direction of the carcass in the tread portion. The tread reinforcing layer includes a belt layer and a band layer. The belt layer includes a single inner belt ply adjacent to the carcass and a single outer belt ply arranged outwardly in the tire radial direction of the inner belt ply. The band layer includes at least one band ply arranged between the inner belt ply and the outer belt ply in the tire radial direction adjacently to both the inner belt ply and the outer belt ply. The inner belt ply includes a plurality of belt cords oriented at a first angle greater than 5 degrees with respect to a tire circumferential direction and a first development width. The outer belt ply includes a plurality of belt cords oriented at a second angle greater than 5 degrees with respect to the tire circumferential direction and a second development width. The at least one band ply includes a plurality of band cords oriented at an angle equal to or less than 5 degrees with respect to the tire circumferential direction. The second development width is greater than the first development width.

DETAILED DESCRIPTION OF THE DISCLOSURE

Hereinafter, an embodiment of the present disclosure will be described in detail based on the drawings.

Figure 1:
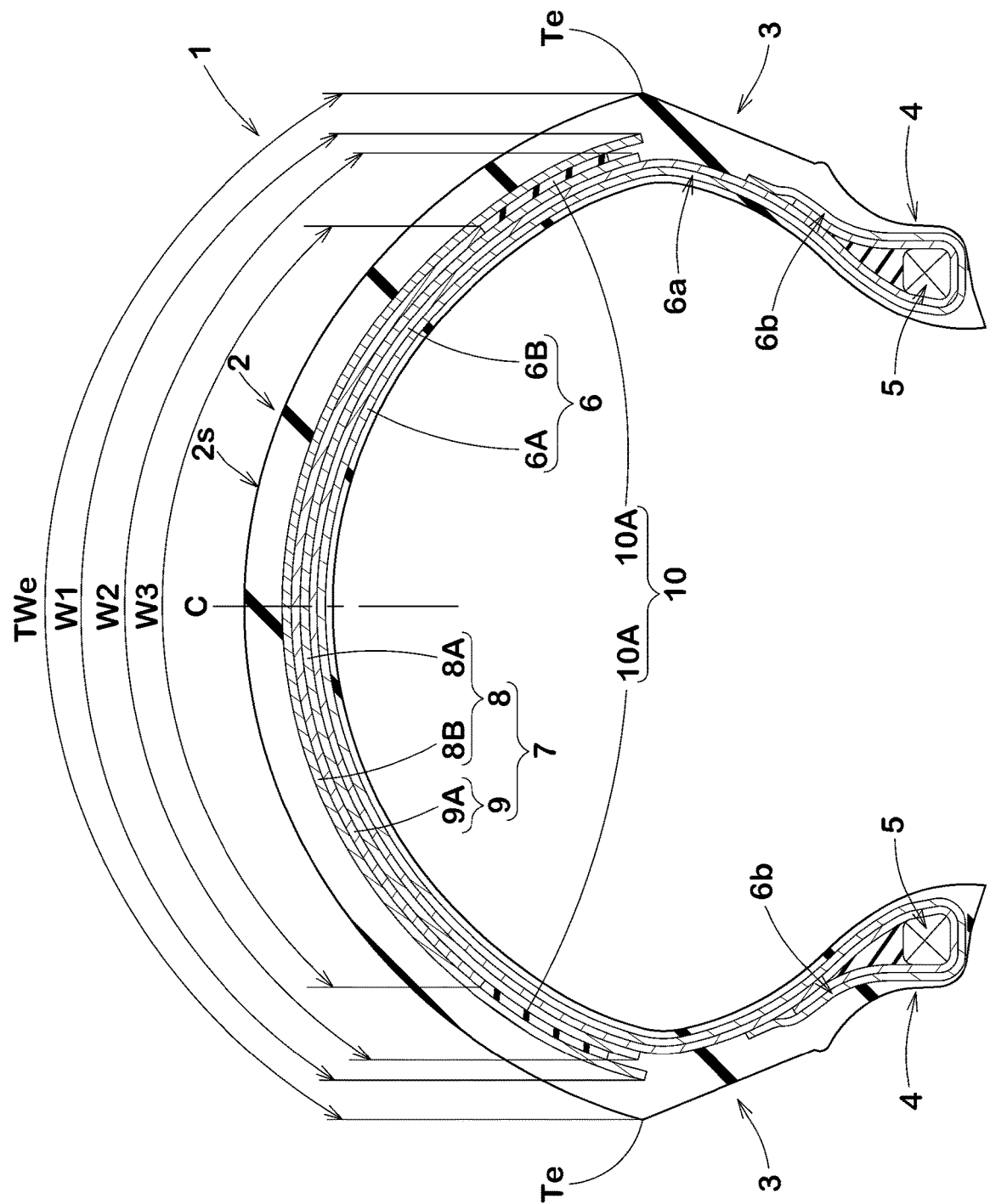
FIG. 1 is a cross-sectional view of a motorcycle tire according to an embodiment of the present disclosure.

FIG. 1 is a tire meridional cross-sectional view of a motorcycle tire 1 (hereinafter, simply referred to as "tire 1") of the embodiment under a normal state.

As used herein, the "normal state" is such that the tire 1 is mounted onto a standard wheel rim with a standard pressure but loaded with no tire load. As used herein, unless otherwise noted, the dimensions of portions of the tire 1 are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the present embodiment includes a tread portion 2, a pair of sidewall portion 3 extending inwardly in the tire radial direction from respective axial ends of the tread portion 2, and a pair of bead portions 4 located inwardly in the tire radial direction of the respective sidewall portions 3. Each bead portion 4, for example, includes a bead core 5 therein.

The tread portion 2 has a tread surface 2s, which is an outer surface of the tread portion 2, for example, extending from the tire equator C to both tread edges Te in a curved arc that is convex outwardly in the tire radial direction. In the present embodiment, the tread edges Te define the maximum tire width. Such a tire 1 can turn with large camber angles.

As used herein, the tread edges Te are the axial outermost edges of the tread portion 2. The tire equator C is the center in the tire axial direction between the tread edges Te. The length measured along the tread surface 2s between the tread ends Te is the tread development width TWe.

In the present embodiment, the tire 1 includes a carcass 6 extending between the bead portions 4 through the tread portion 2 and the pair of sidewall portions 3. The carcass 6, for example, includes a main portion 6a extending between the pair of bead cores 5, and two turn-up portions 6b connected to the main portion 6a and turned up around the respective bead cores 5.

The carcass 6 includes at least one carcass ply. In this embodiment, the carcass 6 includes two carcass plies 6A and 6B. The carcass plies 6A and 6B include a plurality of carcass cords oriented at an angle of from 75 to 90 degrees with respect to the tire circumferential direction, for example.

In the present embodiment, the tire 1 further includes a tread reinforcing layer 7 arranged outwardly in the tire radial direction of the carcass 6 in the tread portion 2. The tread reinforcing layer 7 according to the present embodiment includes a belt layer 8 and a band layer 9.

Figure 2:
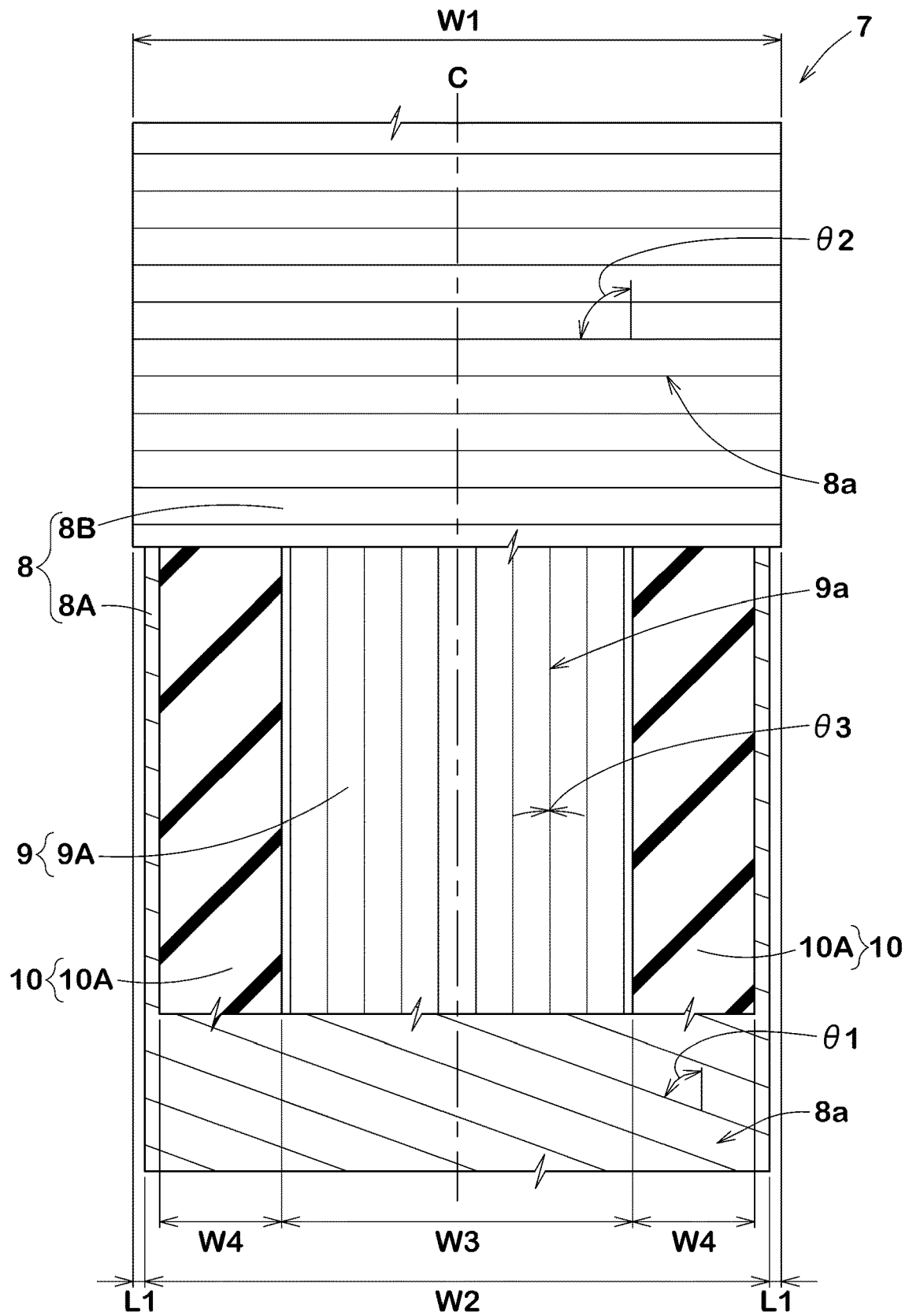
FIG. 2 is a development view of the tread reinforcing layer.

FIG. 2 is a development view of the tread reinforcing layer 7. As illustrated in FIG. 1 and FIG. 2, the belt layer 8 includes a plurality of belt cords 8a. The band layer 9 includes a plurality of band cords 9a.

In the present embodiment, the belt layer 8 includes a single inner belt ply 8A adjacent to the carcass 6 and a single outer belt ply 8B arranged outwardly in the tire radial direction of the inner belt ply 8A.

In the present embodiment, the inner belt ply 8A includes a plurality of belt cords 8a oriented at a first angle θ1 greater than 5 degrees with respect to the tire circumferential direction, and a first development width W2. In the present embodiment, the outer belt ply 8B includes a plurality of belt cords 8a oriented at a second angle θ2 greater than 5 degrees with respect to the tire circumferential direction, and a second development width W1. The belt layer 8 can help to increase the rigidity of the tread portion 2 and to generate a large cornering force due to the hoop effect of the inner belt ply 8A and the outer belt ply 8B.

Here, turning of a motorcycle is performed by tilting the vehicle body. The lateral force generated by the tires 1 is expressed as the sum of the camber thrust generated by the camber angle of the tires 1 and the cornering force generated by the slip angle of the tires 1. When the lateral force generated by the tires 1 is balanced by the centrifugal force of the motorcycle, the motorcycle can turn stably and can be said to have excellent turning performance.

The centrifugal force of a motorcycle, for example, is smaller during from the straight-ahead condition to a gentle turn condition and larger in a sharp turn condition. Hence, by suppressing the cornering force generated by the tire 1 from the straight-ahead condition until a gentle turn condition, and increasing the cornering force in the sharp turn condition, the turning performance of from the straight-ahead condition to the sharp turn condition can be improved.

Since the belt layer 8 can increase the cornering force of the tire 1, the lateral force acting on the tire 1 also increases, which improves the turning performance when the centrifugal force is large, such as in a sharp turn condition.

Further, in the present embodiment, the second development width W1 of the outer belt ply 8B is greater than the first development width W2 of the inner belt ply 8A. Such a belt layer 8 can suppress the occurrence of belt edge loose, which is the separation of one or more belt cords 8a at the edges of the ply, and can improve durability of the tire. The development width of each ply is the length measured along the outer surface of the ply between the axially outermost edges of the ply.

The band layer 9 includes of at least one, in this embodiment, a single band ply 9A, in which the band cords 9a are oriented at an angle θ3 of equal to or less than 5 degrees with respect to the tire circumferential direction. In the present embodiment, the band ply 9A is arranged between the inner belt ply 8A and the outer belt ply 8B in the tire radial direction adjacently to both the inner belt ply 8A and the outer belt ply 8B.

Such a tire 1 can mitigate the hoop effect of the inner belt ply 8A and the outer belt ply 8B, and can suppress the generation of excessive cornering force when the centrifugal force is small, as in the case of the straight-ahead condition to a gentle turn condition. Thus, the tire 1 according to the present embodiment can improve turning performance and the durability.

In some more preferred embodiments, the second angle θ2 of the belt cords 8a of the outer belt ply 8B with respect to the tire circumferential direction is different from the first angle θ1 of the belt cords 8a of the inner belt ply 8A with respect to the tire circumferential direction. Such a belt layer 8 can more reliably achieve the hoop effect of the inner belt ply 8A and the outer belt ply 8B.

In the present embodiment, the second angle θ2 is greater than the first angle θ1. Such a belt layer 8 can increase the rigidity of the tread portion 2 effectively and can generate a larger cornering force because the second angle of the belt cords 8a of the outer belt ply 8B which is closer to the tread surface 2s has a greater angle with respect to the tire circumferential direction.

Preferably, the difference (θ2−θ1) between the second angle θ2 and the first angle θ1 ranges from 10 to 40 degrees. When the difference (θ2−θ1) is equal to or more than 10 degrees, the hoop effect of the inner belt ply 8A and the outer belt ply 8B can be exerted. When the difference (θ2−θ1) is equal to or less than 40 degrees, the difference in cornering force between the area where the band ply 9A exists and the area where the band ply 9A does not exist can be reduced, and the transient characteristics near the edge positions of the band ply 9A can be improved during turning.

Preferably, the first angle θ1 ranges from 50 to 80 degrees. When the first angle θ1 is equal to or more than 50 degrees, the excessive hoop effect can be suppressed and the preferred cornering force can be generated to improve the turning performance. When the first angle θ1 is equal to or less than 80 degrees, the angle difference to the belt cords 8A of the outer belt ply 8B can be set securely, and the hoop effect can be exerted.

Preferably, the second angle θ2 ranges from 70 to 90 degrees. When the second angle θ2 is equal to or more than 70 degrees, the excessive hoop effect can be suppressed and the preferred cornering force can be generated to improve the turning performance. When the second angle θ2 is equal to or less than 90 degrees, the belt cords 8a of the outer belt ply 8B have the same inclination direction as those of the belt cords 8A of the inner belt ply 8A, and thus it can reduce placement errors during manufacturing.

In the present embodiment, the band ply 9A has a third development width W3 that is smaller than the first development width W2 of the inner belt ply 8A. Such a tread reinforcing layer 7 can mitigate the hoop effect of the inner belt ply 8A and the outer belt ply 8B from the straight-ahead condition to the gentle turn conditions and can exert the hoop effect in the sharp turn condition.

Hence, the tire 1 according to the present embodiment can suppress the generation of excessive cornering force from the straight-ahead condition to a gentle turn condition. In addition, the tire 1 can generate a large cornering force in a sharp turn condition, thus improving the turning performance from the straight-ahead to a sharp turn condition.

Preferably, the third development width W3 of the band ply 9A ranges from 30% to 90% of the tread development width TWe. When the third development width W3 of the band ply 9A is equal to or more than 30% of the tread development width TWe, when braking in a straight-ahead condition, the band ply 9A can be reliably included in the ground contact area and the cornering force can be reduced. From this viewpoint, the third development width W3 of the band ply 9A is more preferably equal to or more than 35%, even more preferably equal to or more than 40%, of the tread development width TWe.

When the third development width W3 of the band ply 9A is equal to or less than 90% of the tread development width TWe, the hoop effect in a sharp turn condition can be reliably exerted, and the cornering force can be increased. From this viewpoint, it is more preferable that the third development width W3 of the band ply 9A is equal to or less than 85%, even more preferably equal to or less than 80%, of the tread development width TWe.

Preferably, the difference (W1−W2) between the second development width W1 of the outer belt ply 8B and the first development width W2 of the inner belt ply 8A is equal to or more than 10 mm. That is, in the present embodiment, the distance L1 between the axial outermost edge of the outer belt ply 8B and the axial outermost edge of the inner belt ply 8A is equal to or more than 5 mm on each side of the tire equator C. Such a belt layer 8 can more reliably suppress the occurrence of belt edge loose and can improve the durability.

Figure 3:
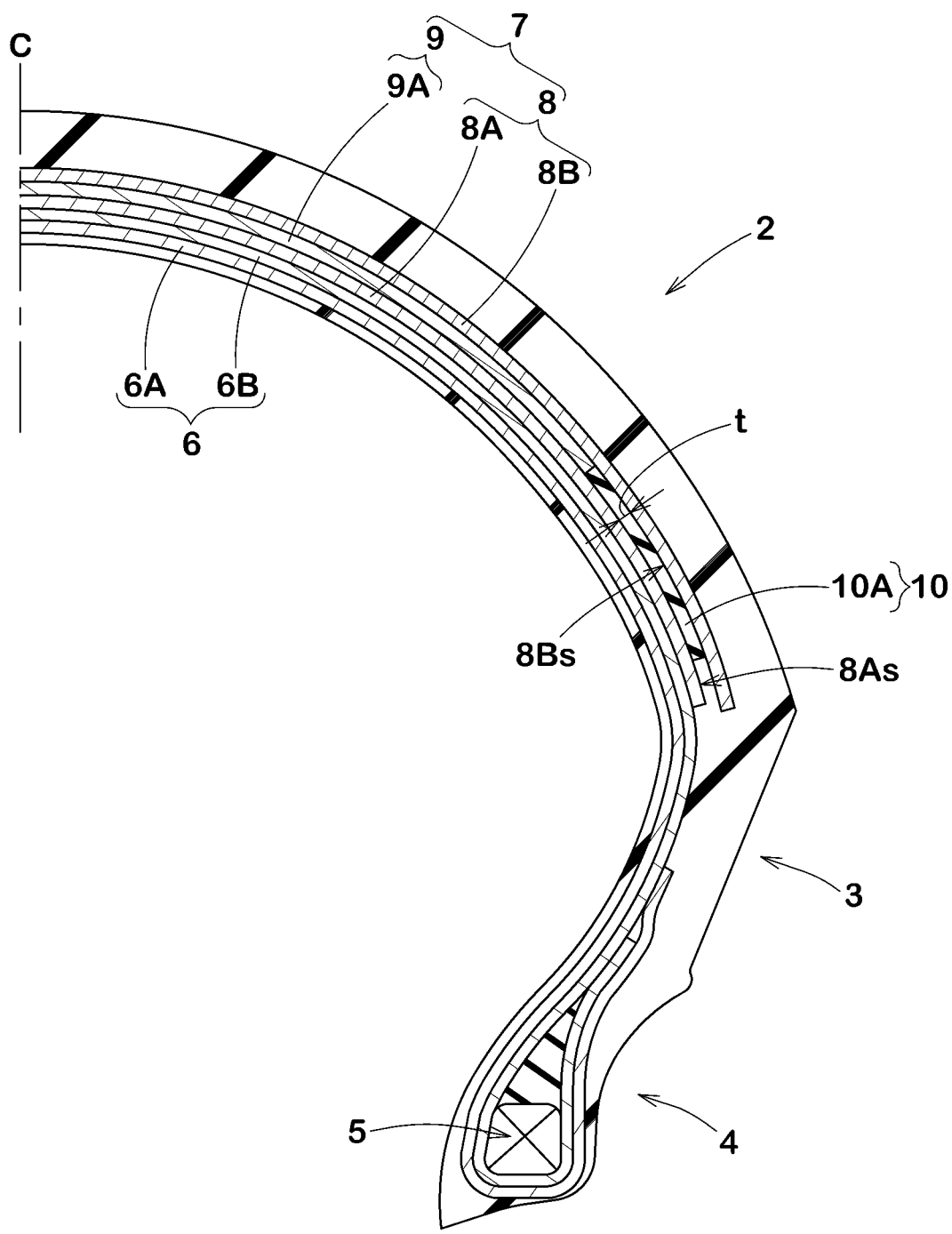
FIG. 3 is an enlarged cross-sectional view of the tread portion.

FIG. 3 is an enlarged cross-sectional view of the tread portion 2. In the present embodiment as illustrated in FIG. 1 to FIG. 3, the tread portion 2 includes at least one rubber layer 10 arranged outwardly in the tire axial direction of the band ply 9A. Preferably, the tread portion 2 includes a pair of rubber layers 10 each arranged on a respective outwardly in the tire axial direction of the band ply 9A. Each rubber layer 10 is made of at least one rubber sheet, in this embodiment a single rubber sheet 10A.

By employing one or more rubber layers 10 made of the rubber sheet 10A, the distance between the components that sandwich the rubber layers 10 is kept substantially constant in the tire axial direction. Note that the "the distance is substantially constant" mean that the variation of the distance with respect to the mean value is within plus/minus 15%.

The tread portion 2 has increased torsional rigidity due to the rubber sheets 10A, and the cornering force in a sharp turn condition can be increased. Thus, the tire 1 according to the present embodiment can further improve the turning performance in a sharp turn condition. Each rubber layer 10 may include a plurality of rubber sheets 10A arranged in the tire radial direction.

In the present embodiment, each rubber layer 10 is arranged between the inner belt ply 8A and the outer belt ply 8B. The distance t between the inner belt ply 8A and the outer belt ply 8B at the position where the rubber layers 10 are arranged is preferably constant in a range from 0.5 to 3.0 mm. The distance t between the inner belt ply 8A and the outer belt ply 8B is the shortest distance between the outer surface 8As of the inner belt ply 8A and the inner surface 8Bs of the outer belt ply 8B.

When the distance t is equal to or more than 0.5 mm, the torsional effect of the rubber layers 10 can be surely exerted and the cornering force in a sharp turn condition can be increased. When the distance t is equal to or less than 3.0 mm, excessive increase in cornering force can be suppressed, and transient characteristics can be improved in areas with the band ply 9A.

In this embodiment, the sum of the development widths W4 of the rubber layers 10 on both sides and the third development width W3 of the band ply 9A (W3+2*W4) is smaller than the first development width W2 of the inner belt ply 8A. Such rubber layers 10 can further improve the torsional rigidity of the tread portion 2.

Preferably, the rubber layers 10 (the rubber sheets 10A) have a complex elastic modulus G* equal to or more than 500 kPa at 70 degrees C. Such a rubber layer 10 can more reliably exert the torsional effect and increase the cornering force during a sharp turn condition.

Here, the complex elastic modulus G* of the rubber layers 10 at 70 degrees C. was a value measured in accordance with JIS-K6394 under the following conditions using a dynamic viscoelasticity measuring device (Iplexer series) manufactured by GABO.

Initial strain: 10%
Amplitude of dynamic strain: plus/minus 1%
Frequency: 10 Hz
Deformation Mode: Tensile
Measurement temperature: 70 degrees C.

While the particularly preferable embodiments in accordance with the present disclosure have been described in detail, the present disclosure is not limited to the illustrated embodiments, but can be modified and carried out in various aspects within the scope of the disclosure.

EXAMPLES

Motorcycle tires having the basic structure shown in FIG. 1 were prepared based on the specifications shown in Table 1. As comparative example 1, motorcycle tires were also prepared in which each band layer was arranged radially outwardly of the belt layer. Then, the turning performance was tested by mounting the test tires on the front and rear wheels of a test motorcycle. The durability was also tested using the tires for rear wheel. The main common items and test methods are as follows.

Common Structure:
Front tire size: 120/70R17
Front wheel air pressure: 250 kPa
Rear tire size: 200/60R17
Rear wheel air pressure: 290 kPa
Test motorcycle: large motorcycle Turning Performance Test:
Using the test motorcycle equipped with the test tires, the test driver's sensory evaluations were made on the performance of the motorcycle in a gentle turn performance from the straight-ahead condition to a gentle turn condition, in a sharp turn condition, and in transient characteristics from the gentle turn condition to the sharp turn condition. The results are indicated in Table 1 as an index with the comparative example 1 (Ref. 1) as 100, where larger values indicate superior the gentle turn performance, sharp turn performance, and transient characteristics. The sum of the gentle turn performance, the sharp turn performance, and the transient characteristics is indicated as the turning performance.

Durability Test:

The test tires for rear wheel were mounted on a drum tester, and were tested for the occurrence of belt edge loose after traveling 7000 km under the load of 5.5 kN, speed of 80 km/h, and camber angle of 0 degrees. The test results are indicated in Table 1 as "failed" if the belt edge loose occurred and "passed" if the belt edge loose did not occur, with "passed" indicating superior durability performance.

Table 1 shows the test results.

TABLE 1

|  | Ref. 1 | Ref. 2 | Ref. 3 | Ref. 4 | Ref. 5 | Ex. 1 | Ex. 2 | Ex. 3 |
|---|---|---|---|---|---|---|---|---|
| Second development width W1 of outer belt ply (mm) | 140 | 130 | 145 | 130 | 130 | 145 | 145 | 145 |
| First development width W2 of inner belt ply (mm) | 140 | 145 | 150 | 145 | 145 | 130 | 130 | 130 |
| Third development width W3 of band ply (mm) | 100 | 80 | 86.7 | 80 | 80 | 80 | 80 | 80 |
| First angle θ1 of inner belt ply (deg.) | 80 | 70 | 70 | 30 | 70 | 70 | 70 | 70 |
| Second angle θ2 of outer belt ply (deg.) | 90 | 90 | 90 | 70 | 90 | 90 | 90 | 90 |
| Distance t between belt piles in rubber layer regions (mm) | — | — | — | — | 1 | 1 | 4 | 1 |
| Complex elastic modulus G* of rubber layers (kPa) | — | — | — | — | 1000 | 1000 | 1000 | 300 |
| Gentle turn performance (index) | 100 | 100 | 100 | 97 | 100 | 100 | 100 | 100 |
| Sharp turn performance (index) | 100 | 105 | 101 | 107 | 110 | 110 | 110 | 106 |
| Transient characteristics (index) | 100 | 100 | 100 | 100 | 100 | 100 | 100 | 100 |
| Turning performance | 300 | 305 | 301 | 304 | 310 | 310 | 310 | 306 |
| Durability (index) | failed | failed | failed | failed | failed | passed | passed | passed |

As a result of the test, it is confirmed that the example tires improve the durability while improving the turning performance compared to the comparative examples, and that it can improve both the turning performance and the durability.

[Additional Note]

The present disclosure includes as follows.

[Note 1]

A motorcycle tire comprising:
a tread portion;
a pair of sidewall portions;
a pair of bead portions each with a bead core therein;
a carcass extending between the bead cores through the tread portion and the pair of sidewall portions; and
a tread reinforcing layer arranged outwardly in a tire radial direction of the carcass in the tread portion; wherein
the tread reinforcing layer comprises a belt layer and a band layer,
the belt layer comprises a single inner belt ply adjacent to the carcass and a single outer belt ply arranged outwardly in the tire radial direction of the inner belt ply,
the band layer comprises at least one band ply arranged between the inner belt ply and the outer belt ply in the tire radial direction adjacently to both the inner belt ply and the outer belt ply,
the inner belt ply comprises a plurality of belt cords oriented at a first angle greater than 5 degrees with respect to a tire circumferential direction and a first development width,
the outer belt ply comprises a plurality of belt cords oriented at a second angle greater than 5 degrees with respect to the tire circumferential direction and a second development width,
the at least one band ply comprises a plurality of band cords oriented at an angle equal to or less than 5 degrees with respect to the tire circumferential direction, and
the second development width is greater than the first development width.

[Note 2]

The motorcycle tire according to note 1, wherein
the difference between the second development width of the outer belt ply and the first development width of the inner belt ply is equal to or more than 10 mm.

[Note 3]

The motorcycle tire according to note 1 or 2, wherein
the band ply has a third development width smaller than the first development width of the inner belt ply.

[Note 4]

The motorcycle tire according to any one of notes 1 to 3, wherein
the band ply has a third development width ranging from 30% to 90% of a tread development width.

[Note 5]

The motorcycle tire according to any one of notes 1 to 4, wherein
the second angle is difference from the first angle.

[Note 6]

The motorcycle tire according to note 5, wherein
the second angle is greater than the first angle.

[Note 7]

The motorcycle tire according to not 6, wherein
the difference between the second angle and the first angle ranges from 10 to 40 degrees.

[Note 8]

The motorcycle tire according to any one of note 7, wherein
the second angle is different from the first angle.
The motorcycle tire according to note 5, wherein
the second angle is greater than the first angle.
The motorcycle tire according to note 6, wherein
the difference between the second angle and the first angle ranges from 10 to 40 degrees.
The motorcycle tire according to note 7, wherein
the first angle ranges from 50 to 80 degrees, and
the second angle ranges from 70 to 90 degrees.

[Note 9]

The motorcycle tire according to any one of notes 1 to 8, wherein
the tread portion comprises a rubber layer arranged outwardly in the tire axial direction of the band ply, the rubber layer is disposed between the inner belt ply and the outer belt ply, and a distance between the inner belt ply and the outer belt ply at the position where the rubber layer is arranged is substantially constant at 0.5 to 3.0 mm.

[Note 10]

The motorcycle tire according to note 9, wherein the rubber layer has a complex elastic modulus equal to or more than 500 kPa at 70 degrees C.

The invention claimed is:

1. A motorcycle tire comprising:
a tread portion having a pair of tread edges defining a maximum tire width, the pair of tread edges being located radially inwardly with respect to a tire section height at a tire equator;
a pair of sidewall portions;
a pair of bead portions each with a bead core therein;
a carcass extending between the bead cores through the tread portion and the pair of sidewall portions; and
a tread reinforcing layer arranged outwardly in a tire radial direction of the carcass in the tread portion, wherein
the tread reinforcing layer comprises a belt layer and a band layer,
the belt layer comprises a single inner belt ply adjacent to the carcass and a single outer belt ply arranged outwardly in the tire radial direction of the inner belt ply,
the band layer comprises at least one band ply arranged between the inner belt ply and the outer belt ply in the tire radial direction adjacently to both the inner belt ply and the outer belt ply,
the inner belt ply comprises a plurality of belt cords oriented at a first angle greater than 5 degrees with respect to a tire circumferential direction and a first development width,
the first angle ranges from 50 to 80 degrees,
the outer belt ply comprises a plurality of belt cords oriented at a second angle greater than 5 degrees with respect to the tire circumferential direction and a second development width,
the second angle is 90 degrees,
the at least one band ply comprises a plurality of band cords oriented at an angle equal to or less than 5 degrees with respect to the tire circumferential direction,
the second development width is greater than the first development width,
the tread portion comprises a pair of rubber layers arranged outwardly in the tire axial direction of the band ply,
the pair of rubber layers is disposed between the inner belt ply and the outer belt ply,
a distance between the inner belt ply and the outer belt ply at the position where the pair of rubber layers is arranged is substantially constant at 0.5 to 3.0 mm,
an innermost end in the tire axial direction of each rubber layer is directly connected to an axially outermost end of the band ply,
each rubber layer has a complex elastic modulus equal to or more than 500 kPa at 70 degrees C.,
each rubber layer has a thickness that is the same as the band ply thickness, and
the sum of development widths W4 of the pair of rubber layers and a third development width W3 of the band ply (W3+2*W4) is smaller than the first development width W2 of the inner belt ply.

2. The motorcycle tire according to claim 1, wherein the difference between the second development width of the outer belt ply and the first development width of the inner belt ply is equal to or more than 10 mm.

3. The motorcycle tire according to claim 2, wherein the band ply has a third development width smaller than the first development width of the inner belt ply.

4. The motorcycle tire according to claim 2, wherein the band ply has a third development width ranging from 30% to 90% of a tread development width.

5. The motorcycle tire according to claim 1, wherein the band ply has a third development width smaller than the first development width of the inner belt ply.

6. The motorcycle tire according to claim 5, wherein the band ply has a third development width ranging from 30% to 90% of a tread development width.

7. The motorcycle tire according to claim 1, wherein the band ply has a third development width ranging from 30% to 90% of a tread development width.

* * * * *